United States Patent [19]

Nevels

[11] Patent Number: 5,173,157

[45] Date of Patent: Dec. 22, 1992

[54] METHOD FOR PROCESSING RESIDUAL FIXING-BATHS

[76] Inventor: Leonardus M. M. Nevels, Daalzicht 37, 6097, Ek Heel, Netherlands

[21] Appl. No.: 618,250

[22] Filed: Nov. 21, 1990

[30] Foreign Application Priority Data

Nov. 21, 1989 [NL] Netherlands .......................... 8902870

[51] Int. Cl.$^5$ ................................................. C02F 9/00
[52] U.S. Cl. ..................................... 204/149; 210/720; 210/724; 210/726; 430/399; 430/400
[58] Field of Search ................ 204/149; 210/718, 720, 210/726, 724; 430/400, 399, 398

[56] References Cited

U.S. PATENT DOCUMENTS

| | | | |
|---|---|---|---|
| 3,627,676 | 12/1971 | Eccles, Jr. ............................. | 210/11 |
| 3,728,439 | 4/1973 | Urban ................................... | 210/757 |
| 3,832,453 | 8/1974 | Slovonsky et al. ................... | 430/400 |
| 3,869,386 | 3/1975 | Izdebski ................................ | 210/725 |
| 3,896,209 | 7/1975 | Fournier et al. ...................... | 210/720 |
| 3,901,805 | 8/1976 | Stewart ................................. | 210/720 |
| 4,260,491 | 4/1981 | Cassidy et al. ....................... | 210/720 |
| 4,755,453 | 7/1988 | Kunda et al. ......................... | 430/398 |
| 5,000,859 | 3/1991 | Suciu et al. .......................... | 210/720 |

FOREIGN PATENT DOCUMENTS 8902489 10/1989 Netherlands .
8902490 10/1989 Netherlands .

OTHER PUBLICATIONS

H. F. Mark et al: "Kirk-Othmer Encyclopedia of Chemical Technology," 3rd Edition, vol. 22, 1978.

*Primary Examiner*—Donald R. Valentine
*Assistant Examiner*—Arun S. Phasge
*Attorney, Agent, or Firm*—Foley & Lardner

[57] ABSTRACT

A method for processing residual fixing-baths, whereby a residual fixing-bath after demetalization by means of sulfide or by means of electrolysis, is acidified with a mixture of nitric acid and sulphuric acid, and the precipitated sulphur is removed. A liquid suitable as a gas washing liquid for flue gases and/or liquid fertilizer component is also prepared by an integrated processing of two or three waste materials.

10 Claims, No Drawings

METHOD FOR PROCESSING RESIDUAL FIXING-BATHS

The invention relates to a method for processing residual fixing-baths.

Under residual fixing baths are understood the liquids of fixing-baths and bleach fixing-baths originating from the photographic and photochemical industries. Such residual baths comprise silver and other heavy metals, such as copper, chromium, nickel, etc. in complexed form, in particular as ethylenedinitrilotetracetate (EDTA)-complexes, thiosulfate and other sulphur compounds, such as sulfide, sulfite and sulfate. Fixing-baths have in addition a high chemical oxygen consumption (C.Z.V.) of ±80,000 mg O/liter and a high Kjeldal-nitrogen value of ±20,000 mg N/liter.

Hitherto such silver containing residual baths are desilvered via electrolysis, via ion exchange, cementation or by reaction with a sulfide solution. Thereby silver and other heavy metals, such as copper, chromium and nickel, are largely removed, whereafter the residual liquid is discharged to the sewerage. Some residual baths are combusted a.o. by the A.V.R.. This causes serious problems in connection with pollution of the environment in both instances. On discharging to the sewerage the pollution value in inhabitant equivalents (i.e.) is given by the formula :

i.e. = 1/136 (C.Z.V. +4.57 N).

If 1000 l residual baths per 24 hours are discharged to the sewerage, this implies:

i.e. = 1/136 ×(80,000 +4.57 ×20,000) = 1257.

Thus 365 m³ residual bath per annum imply a pollution of 1257 i.e.. The degradability in sewerage purification installations is very small.

In contrast combustion of residual baths with household refuse causes serious problems of distribution of sulphurdioxide in the environment as a consequence of the high sulphur content and the ovens are affected.

In Applicant's earlier, not prepublished Dutch Patent Application No.89 02489 a method is described for the oxidative degradation of residual fixing liquids, obtained after desilvering of photographically used fixing- and bleach fixing-baths. Thereby the residual liquids are sprayed, under addition of nitrates and calcium ions into a hot oxidizing gas flow, for which in particular flue gas of industrial installations or combustion ovens is used. This method provides good results, but is of course only useful if such a flue gas is available. In the absence thereof another solution will have to be found.

It is now the object of the present invention to process such residual baths in such a way, that they can be burned directly or are suitable as (liquid) fertilizer. In addition the invention provides in treating the residual fixing-baths in such a way, that these can be used as reduction agent for the degradation of used chromic acid solutions from the galvanic industry.

The invention provides thereto in a method for processing residual fixing-baths, characterised in that a residual fixing-bath is acidified with a mixture of nitric acid and sulphuric acid after demetallization by means of sulfide or by means of electrolysis, and the precipitated sulphur is removed. Suitably the demetallized residual fixing-bath is acidified with a 1:3 mixture of about 53% nitric acid and about 25% sulphuric acid. As sulphuric acid can suitably be used spent battery acid, that is the waste liquid from batteries. The nitric acid-sulphuric acid mixture is thereby preferably selected in a ratio of 7:1 to 10:1. Bij the reaction with an excess of hydrogen ions, the thiosulfate in the acidified liquid, which is the most important component of the sulphur compound, is decomposed into sulphur and sulphur dioxide, whereby a precipitate of sulphur is formed and an acidic sulfite solution, which in addition is rich in $NH_4+$, $Na+$, iron, EDTA-complexes and traces of heavy metal ions. After removal of the sulphur precipitate a clear, acidic sulfite liquid is obtained, which is suitable either for further processing or for application as a reduction agent for spent chromic acid.

In the first case the acidic sulfite containing liquid is subsequently adjusted to a pH value of over 7 by addition of $Ca(OH)_2$ milk, whereafter stirring for some time, removal of the precipitate formed, consisting substantially of calcium sulfite, further calcium sulfate, other sulfates and metal hydroxides, and aerating the remaining liquid for a sufficient period of time to convert all the sulfite into sulfate. The additionally formed calcium sulfate during aeration may be removed, leaving a liquid which can be combusted without environmental problems, can be used as fertilizer for infertile land and/or can be used as gas washing liquid.

However it is also possible to use the acidic sulfite containing liquid, obtained by acidification with the mixture of nitric acid and sulphuric acid, as a reduction agent for the processing of chromic acid waste liquids originating from the galvanic industry. The invention provides to that end the acidic sulfite containing liquid is added as a reduction agent to chromic acid waste liquids. By adding $Ca(NO_3)_2$ and $Ca(OH)_2$ to a pH >5, the precipitated $CaSO_4$, $Cr(OH)_3$ and other metal hydroxides are removed.

Thereby $Ca(NO_3)_2$ and $Ca(OH)_2$ may be added in one stage to a pH of 7, whereby the dichromate and/or chromate are reduced to trivalent chromium as a consequence of the redox reactions taking place, and precipitate as $Cr(OH)_3$, whereby the additional heavy metals present will precipitate as hydroxides together with $CaSO_4$. After removal of the precipitate a liquid is obtained again, which may be combusted or may be used as a fertilizer liquid.

It is also possible to use two stages, whereby $Ca(NO_3)_2$ and $Ca(OH)_2$ are added in a first stage to a pH of 5-6, the precipitated $CaSO_4$ is removed, and subsequently the pH is increased to 8 with $Ca(OH)_2$, and the precipitated $Cr(OH)_3$ and other metal hydroxides are removed.

In the following the invention will be illustrated in detail by means of an example.

A mixed fixing- and bleach fixing residual bath, rich in thiosulfate and comprising heavy metals in EDTA-complexes, is used as starting material for processing. After desilvering an average analysis of metal ions provides:

Cu = 4,92 mg/l
Cr = 3,40 mg/l
Ni = 3,83 mg/l
Pb = 4,38 mg/l
Zn = 4,65 mg/l
Cd = 1,02 mg/l
Ag = 2,97 g/l
Hg = 19 µg/l
Fe = 2,66 g/l (complexed).

The total of sulphur comprising anions (90% $S_2O_3^{--}$ and in addition $S^{--}$, $SO_3^{--}$ and $SO_4^{--}$), measured as $SO_4^{--}$, amounts to 135 g/l. Further this liquid has a C.Z.V. value of 80,000 mg $O_2$/l and a Kjeldal N value of 165,000 mg $N_2$/l.

6 m$^3$ of this residual bath were mixed with a mixture of 200 l 53% $HNO_3$ in 600 l spent battery acid (25%). Thus two waste products were processed in an integrated manner, i.e. residual fixing-bath and spent battery acid.

According to a known reaction $S_2O_3^{--} + 2H^{3O} \rightleftharpoons H_2SO_3 \rightleftharpoons S + SO_2 + H_2O$ a precipitate of sulphur is formed and a solution, wherein $SO_2$ is dissolved in sulfite. This sulfite containing solution comprises in addition many $NH_4^+$, $Na^+$, $Fe^{++(+)}$ EDTA complex and traces of other heavy metal ions. As anions $NO_3^-$, $SO_3^{--}$, $SO_4^{--}$ and a little $Br^-$ are present. In addition to sulphur small amounts of AgBr are precipitated. The precipitate is removed, washed and may be sold as sulphur. Subsequently the clear liquid is adjusted to a pH of more than 7 by means of $Ca(OH)_2$ milk.

After stirring for some time, a precipitate is formed, consisting of $CaSO_3$ (predominantly), $CaSO_4$, $PbSO_4$, $Fe(OH)_3$ and some other hydroxides of heavy metals. The clear liquid remaining after filtration, comprises a.o. $NO_3^-$, $NH_4^+$, $NH_3$, $Ca^{++}$EDTA complex, $Fe^{++(+)}$ EDTA complex and traces of other heavy metals. The content of metals is represented in the table below.

Cu = 0,4 mg/l
Cr = 0,4 mg/l
Ni = 3,1 mg/l
Pb = 0,5 mg/l
Zn = 8,0 mg/l
Cd = <0,1 mg/l
Ag = 0,8 mg/l
Fe = 32 mg/l
Ca = 8 g/l (complexed)
Na = 8 g/l.

The liquid is very rich in ammonia, $NH_4^+$, $NO_3^-$ (analysed $NO_3^-$ = 28 g/l), $SO_3^{--}$. Th calcium is predominantly complexed as EDTA complex. The C.Z.V. value of this liquid is decreased to 40,000, while the Kjeldal N value amounts to 8,400.

Subsequently this liquid is aerated, whereby $SO_3^{--}$ is converted into $SO_4^{--}$, and $Fe^{++}$ into $Fe^{+++}$. During this aeration $CaSO_4$ is formed in addition, which can be removed. Thus a liquid will remain, comprising relatively little sulfate and which can be combusted without problems.

This liquid can be used in addition as gas washing liquid, as described in the two Dutch Patent Applications Nos. 89 02489 and 89 02490, also originating from Applicant.

The liquid can also be used as fertilizer liquid for types of soil, which are poor in humic acids. Thereby the EDTA present in the liquid assumes the position of the humic acids and causes, that mineral feedstuffs from for example desert soil, are made mobile.

In this way two waste liquids, to wit residual fixing- and bleach fixing-baths and waste battery acid of chemical waste are thus converted into a useful product.

The integrated action of waste materials such as described above, can be extended by using the acidic sulfite containing liquid, obtained after desulfurization by means of the application with the mixture of nitric acid and sulphuric acid, as reduction agent for chromic acid waste liquid. Thereby chromic acid, dichromate and/or chromate containing waste are reduced as follows:

$$3SO_3^{--} + 8H_3O^+ + Cr_2O_7 \rightarrow 3SO_4^{--} + 2Cr^{+++} + 12H_2O$$

in acidic medium.

By addition of $Ca(NO_3)_2$ and $Ca(OH)_2$ to a pH of 5-6, a precipitate of $CaSO_4$ is formed. After removal of $CaSO_4$ the pH can be increased still further to 8 by means of $Ca(OH)_2$, whereby $Cr(OH)_3$ will precipitate together with other hydroxides. Alternatively the pH may also be increased to 7 directly, whereby a mixed precipitate of $CaSO_4$ and $Cr(OH)_3$ is formed.

The liquid remaining after filtration and decantation again may be combusted, oxidized, or be used as fertilizer liquid.

Thus three important waste liquids can be processed integrally, whereby only lime is required as additional chemical.

We claim:

1. A method for processing a residual fixing-bath which has been demetallized by the addition of sulfide or by electrolysis, comprising the steps of
   (a) acidifying said fixing-bath by adding a mixture of nitric acid and sulphuric acid to precipitate sulphur;
   (b) removing the precipitated sulphur from said acidified fixing-bath;
   (c) adjusting the pH of said acidified fixing-bath to 7 by the addition of $Ca(OH)_2$ milk;
   (d) stirring said fixing-bath;
   (e) removing the precipitate formed in said fixing bath; and
   (f) aerating the remaining liquid for a sufficient period of time to convert all the sulfite in said remaining liquid into sulfate.

2. A method according to claim 1, wherein said sulfate is removed to produce a liquid suitable for use as a gas washing liquid for flue gases.

3. A method according to claim 1, wherein said sulfate is removed to produce a liquid fertilizer component.

4. A method according to claim 1, wherein said mixture comprises a 1:3 mixture to about 53% nitric acid and about 25% sulphuric acid.

5. A method according to claim 4, wherein said sulphuric acid is spent battery acid.

6. A method according to claim 4, wherein said mixture of nitric and sulphuric acid is added to said fixing-bath in a fixing-bath:mixture ratio ranging from 7:1 to 10:1.

7. A method according to claim 6, wherein said mixture comprises 0.2 m$^3$ 53% nitric acid and 0.6 m$^3$ spent battery acid per 6 m$^3$ of said residual fixing-bath.

8. A method for processing a residual fixing-bath which has been demetallized by the addition of sulfide or by electrolysis, comprising the steps of
   (a) acidifying said fixing-bath by adding a mixture of nitric acid and sulphuric acid to precipitate sulphur;
   (b) removing the precipitated sulphur from said acidified fixing-bath: wherein said acidified fixing-bath is further treated to form a reducing agent by adjusting the pH of said acidified fixing-bath to >5.0 by the addition of $Ca(NO_3)_2$ and $Ca(OH)_2$, adding said reducing agent to liquid chromic acid waste to precipitate $CaSO_4$, $Cr(OH)_3$ and other metal hydroxides from said chromic acid waste and then removing said precipitated $CaSO_4$, $Cr(OH)_3$ and metal hydroxides.

9. A method according to claim 8, wherein the pH of said acidified fixing-bath is adjusted to 7 by the addition of $Ca(NO_3)_2$ and $Ca(OH)_2$.

10. A method according to claim 8, wherein the pH of said acidified fixing-bath is first adjusted to a range of 5-6 by the addition of $Ca(NO_3)_2$ and $Ca(OH)_2$; the resulting precipitated $CaSO_4$ is removed; the pH of said fixing-bath is then adjusted to 8 by the addition of $Ca(OH)_2$, and the resulting precipitated $Cr(OH)_3$ and other metal hydroxides are then removed.

* * * * *